United States Patent
Varekamp

(10) Patent No.: US 9,258,551 B2
(45) Date of Patent: Feb. 9, 2016

(54) AUTO-STEREOSCOPIC DISPLAY DEVICE AND DRIVING METHOD

(71) Applicant: KONINKLIJKE PHILIPS N.V., Eindhoven (NL)

(72) Inventor: Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/396,409

(22) PCT Filed: Apr. 22, 2013

(86) PCT No.: PCT/IB2013/053163
§ 371 (c)(1),
(2) Date: Oct. 23, 2014

(87) PCT Pub. No.: WO2013/160815
PCT Pub. Date: Oct. 31, 2013

(65) Prior Publication Data
US 2015/0085091 A1    Mar. 26, 2015

Related U.S. Application Data

(60) Provisional application No. 61/637,335, filed on Apr. 24, 2012.

(51) Int. Cl.
*H04N 13/04* (2006.01)
*G02B 27/22* (2006.01)
*F21V 5/00* (2015.01)

(52) U.S. Cl.
CPC ............ *H04N 13/0418* (2013.01); *F21V 5/007* (2013.01); *G02B 27/225* (2013.01); *G02B 27/2214* (2013.01); *H04N 13/0404* (2013.01); *H04N 13/0447* (2013.01); *H04N 13/0477* (2013.01)

(58) Field of Classification Search
CPC ............ G02B 27/2214; G02B 27/225; H04N 13/0404; H04N 13/0418; H04N 13/0447; H04N 13/0477; F21V 5/007
USPC .......................................... 348/59; 362/97.1
See application file for complete search history.

(56) References Cited

U.S. PATENT DOCUMENTS

| | | | |
|---|---|---|---|
| 6,061,489 A | 5/2000 | Ezra | |
| 6,101,008 A * | 8/2000 | Popovich | 359/15 |
| 6,433,930 B1 | 8/2002 | Son | |
| 7,189,983 B2 | 3/2007 | Aguirre | |
| 2008/0086289 A1* | 4/2008 | Brott | 703/6 |
| 2008/0170293 A1 | 7/2008 | Lucente | |
| 2008/0204546 A1 | 8/2008 | Dawe | |
| 2012/0056879 A1 | 3/2012 | Song | |

FOREIGN PATENT DOCUMENTS

| | | |
|---|---|---|
| JP | 2010224129 A | 10/2010 |
| JP | 2012022143 A | 2/2012 |

* cited by examiner

*Primary Examiner* — Farzana Hossain
*Assistant Examiner* — Matthew Kwan

(57) ABSTRACT

The invention provides a directional back-light arrangement for an auto-stereoscopic display in which different parts of the backlight arrangement point in different directions. This means that different parts of the backlight arrangement will be suitable for directing images in different directions, while reducing the effect of optical aberrations resulting from large exit angles.

10 Claims, 5 Drawing Sheets

AUTO-STEREOSCOPIC DISPLAY DEVICE AND DRIVING METHOD

FIELD OF THE INVENTION

This invention relates to auto-stereoscopic display devices.

BACKGROUND OF THE INVENTION

Various types of auto-stereoscopic display device are known. Essentially, such displays include an optical arrangement which directs different views into different directions at which the eyes of a user may be located, so that the user does not need to wear special glasses for this purpose.

The different directions of the views to different locations can for example be achieved with a lens arrangement, with individual lenses covering groups of pixels. The lenses then direct light from different pixels in different directions, and in this way different images (e.g. left and right) can be sent to different directions.

Another approach is to use a barrier arrangement. This again has the function of limiting the direction in which light from individual pixels can be sent.

A problem with this arrangement is that the resolution of the individual views is reduced. By operating in time-multiplex as well as spatial-multiplex manner increased resolution can be obtained.

The designs outlined above provide the different views in fixed different directions. However, other designs provide tracking of the position the eyes of one or more viewers. This means that for each viewer only two views need to be generated, instead of a full set of views (typically 9 or 15) filling the field of view.

This invention is particularly concerned with a known type of auto-stereoscopic display in which a light-steering backlight is used to direct light into the eyes of one or multiple viewers that are detected using cameras. The left- and right-images are displayed sequentially on an LCD.

For each viewer, two direction light source configurations of the backlight are switched on and off in phase with the LCD such that at a given moment in time each eye sees either the correct image or a black screen.

A light-steering backlight can for example comprise a pixellated backlight and a lens arrangement. By controlling backlight elements, the resulting light output direction is determined by the lens. Electrowetting prism arrays can also be provided for directing a backlight output in different directions.

Typically, a lens array is used to achieve the required light-steering. However, these lens arrays suffer from aberrations off-axis. As a consequence, loss of angular resolution occurs at larger incidence angles. This is a problem with backlight-steering approaches generally.

To address this problem, it has for example been proposed to place the illumination sources on a curved surface and to limit the aperture of each optical element. Multiple optical elements are then stacked and shifted a distance horizontally equal to the width of the aperture opening. A vertical diffuser can be used to achieve a homogeneously lit display. This however results in a more complicated optical structure.

SUMMARY OF THE INVENTION

According to the invention there is provided a device and method as claimed in the independent claims.

According to one aspect of the invention, there is provided a backlight arrangement for an auto-stereoscopic display device, comprising:

a segmented backlight; and a lens arrangement comprising an array of lens units, wherein a respective sub-array of—backlight segments is associated with each lens unit of the lens arrangement, such that the lens unit directs light output from different backlight segments in different directions, wherein each backlight sub-array provides illumination to a light tube with the respective lens unit at the end of the light tube, and wherein the light tubes comprise at least two sets, with the light tubes of a first set all parallel to each other and facing a first direction and the light tubes of a second set all parallel to each other and facing a second direction.

This arrangement provides a backlight arrangement in which different parts of the backlight arrangement point in different directions. This means that different parts of the backlight arrangement will be suitable for directing images in different directions, while reducing the effect of optical aberrations resulting from large exit angles. It would in theory be beneficial to provide rotation of the lenses to have their optical axis directly towards the viewer. However, this is practically not feasible. The invention instead provides sets of lenses with different static orientations. Each tube of the light tube array directs light efficiently in its own limited angular range.

The invention enables an increased viewing angle for a flat auto-stereoscopic display. Thus, the invention also provides an auto-stereoscopic display device comprising: the backlight arrangement and a light modulating display panel illuminated by the backlight arrangement.

To address the problem of off-axis lens aberrations, the invention provides the rotation of the optical axes in a flat matrix structure. The lens optical axes are in particular rotated in the horizontal (column) direction.

The light tubes can comprise three sets, wherein the light tubes of the first set are directed normally to the display panel, the light tubes of the second set are directed laterally to one side of the normal and the light tubes of the third set are directed laterally to the other side of the normal.

The light tubes of the second and third sets can be directed laterally to the side of the normal by an amount between 10 and 30 degrees. Each light tube can for example have an exit area of between 0.25 square centimeters ($cm^2$) and 4 square centimeters ($cm^2$).

Each set of light tubes can comprise a plurality of (horizontal) rows of light tubes, with light tubes of one set alternated with the light tubes of the other sets. A vertical diffuser at the output of the backlight arrangement can then be used so that the rows of light tubes which are providing illumination have their light output expanded in the column (vertical) direction.

A camera arrangement is preferably provided for tracking the location of one or more viewers, and the display further comprises a controller adapted to select which set of light tubes to use for each image to be presented in dependence on the viewer location, and to control the backlight arrangement to control the direction of illumination to the display panel for each image.

In this way, the best light tubes to be used are selected, and then the sub-array of backlight segments is controlled to provide the required illumination direction.

The invention also provides a method of controlling an auto-stereoscopic display device which comprises a backlight arrangement comprising a segmented backlight and a lens arrangement comprising an array of lens units, wherein a respective sub-array of backlight segments is associated with each lens unit of the lens arrangement, such that the lens unit directs light output from different backlight segments in different directions, wherein the method comprises:

aligning each backlight sub-array with a light tube having the respective lens unit at the end of the light tube, and wherein the light tubes comprise at least two sets, with the light tubes of a first set all parallel to each other and facing a first direction and the light tubes of a second set all parallel to each other and facing a second direction;

detecting the position of a viewer;

based on the viewer position, determining which set of light tubes to use to display an image to each eye of the viewer; and for the selected light tubes, controlling the associated sub-array of backlight segments to provide illumination in a direction through a light modulating display panel to each eye of the viewer.

BRIEF DESCRIPTION OF THE DRAWINGS

Examples of the invention will now be described in detail, with reference to the accompanying drawings, in which.

DETAILED DESCRIPTION OF THE EMBODIMENTS

The invention provides a directional backlight arrangement for an auto-stereoscopic display in which different parts of the backlight arrangement point in different directions. This means that different parts of the backlight arrangement will be suitable for directing images in different directions, while reducing the effect of optical aberrations resulting from large exit angles.

Figure 1:
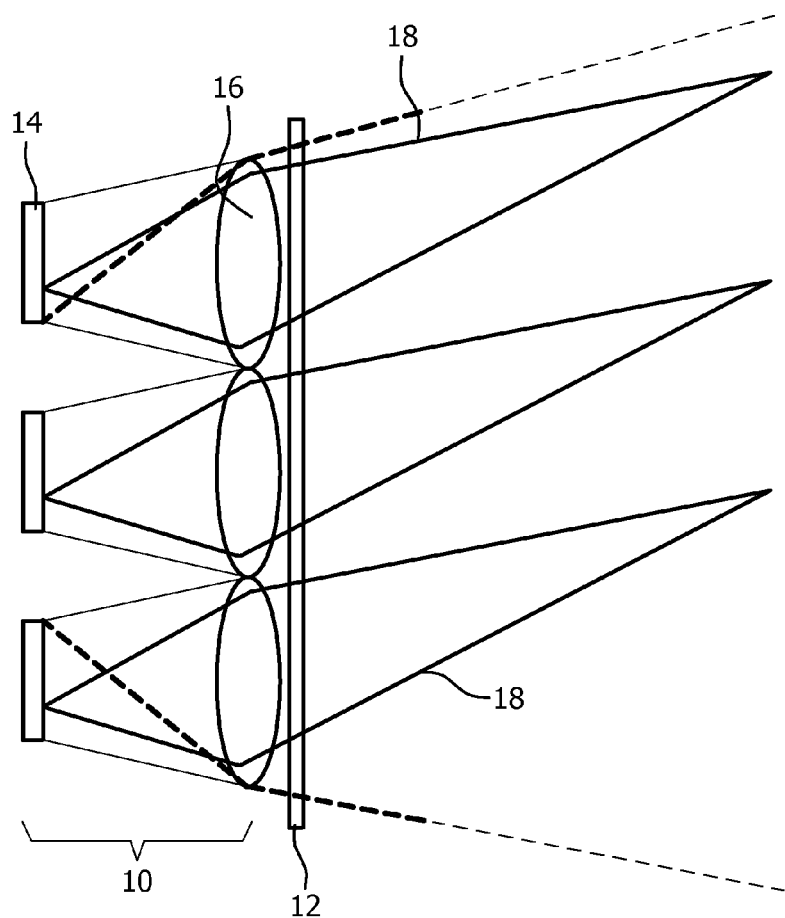
FIG. 1 is used to explain the basic operation of a known backlight steering auto-stereoscopic display device.

FIG. 1 is used to explain generally the type of display device to which the invention relates.

The display comprises a backlight arrangement 10 and a light modulating display panel 12, such as an LC panel. The backlight arrangement comprises a set of segmented backlight sub-arrays 14, each of which is associated with an output lens 16.

The more backlight sub-arrays there are, the greater the number of backlight segments that can be turned on to provide illumination of the display panel, so that the intensity of the individual backlight segments can be reduced. Of course, a greater number of backlight segments implies a more complicated structure as well as higher cost as a result of the greater number of light sources. The size of the backlight sub-array is sufficient to enable a desired number of individually addressable backlight segments (e.g. individual LEDs) to be provided so as to give the desired controllability of the illumination direction. Thus, a compromise is found between the complexity of the lens structure, the size of the individual lighting segments, the number of lighting segments per sub-array and the required backlight intensity per segment.

The limiting factor is typically the size of a single controllable light segment in the backlight sub-array. For a given viewing distance, a given angular resolution of view directions will be required, and this in turn specifies the spatial resolution of the light source array, which relates to the size and spatial resolution of the light sources and lenses.

Each sub-array has a grid of light sources, such as LEDs. By selecting which LEDs are illuminated, the light output direction from the lenses can be controlled. As shown in FIG. 1, by using a selected LED within each sub-array, the light output direction from each lens is the same, as shown by envelopes 18. By suitable selection of one or more light sources in each sub-array 14 for each lens 16, the envelopes 18 can converge so that they meet at a single eye position for a designed viewing distance. Thus, by controlling the sub-arrays, the light output can be directed to specific lateral (i.e. left-right) position in space at a given viewing distance. A problem with this type of arrangement is that optical aberrations affect the light output for large non-normal exit angles.

The invention also uses backlight sub-arrays, but provides the light to a light tube with the respective lens unit at the end of the light tube. The light tubes comprise at least two sets, with the light tubes of a first set all parallel to each other and facing a first direction and the light tubes of a second set all parallel to each other and facing a different second direction.

Figure 2:
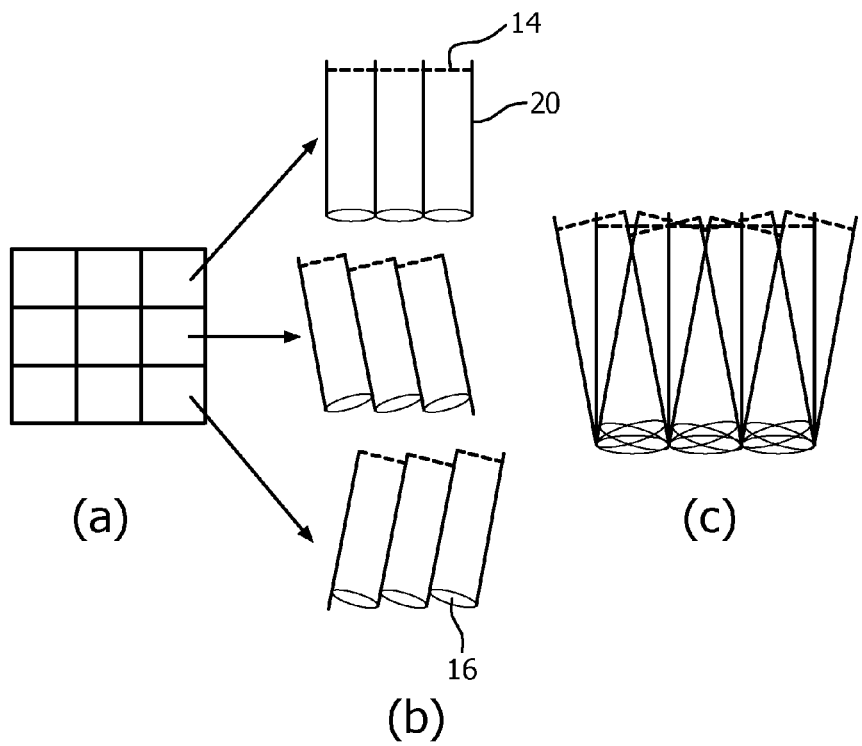
FIG. 2 shows a backlight arrangement of an auto-stereoscopic display device of the invention.

FIG. 2 shows an example of the light tube arrangement in which there are three sets of light tubes. The light tubes of the first set are directed normally to the display panel, the light tubes of the second set are directed laterally to one side of the normal and the light tubes of the third set are directed laterally to the other side of the normal.

In the example of FIG. 2, the set of light tubes are in rows. FIG. 2 shows three rows of light tubes. FIG. 2(a) shows a front view of three rows of three light tubes.

The top row has tubes directed normally. The next row has light tubes directed to the right (as seen when facing the backlight arrangement) and the bottom row has light tubes directed to the left. A view from above the backlight arrangement top edge is shown in FIG. 2(b) for each of the three rows.

As shown, each backlight sub-array 14 is provided at the entrance end of a light tube 20 having light absorbing walls. In this way, only direct light from the backlight sub-array reaches the light lens, and high contrast is achieved. Reflective vertical walls can be used to increase the light output efficiency but this will reduce the contrast. The exit end of each light tube 20 is provided with a lens, or set of lenses (this lens or set of lenses is generally termed a "lens unit"). FIG. 2(b) shows how the light tubes are arranged in different direction in the different rows. All light tubes of one set are parallel to each other. All light tubes are horizontal (i.e. face outwardly) and the angular difference is in the lateral (i.e. left-right) direction. By defining the sets of light tubes as rows, it is possible to combine the light tubes to define a continuous output surface as shown in FIG. 2(a).

FIG. 2(c) shows the plan view of all three rows superimposed on each other.

The backlight sub-array illuminates an entire lens, so that no aperture is used.

Figure 3:
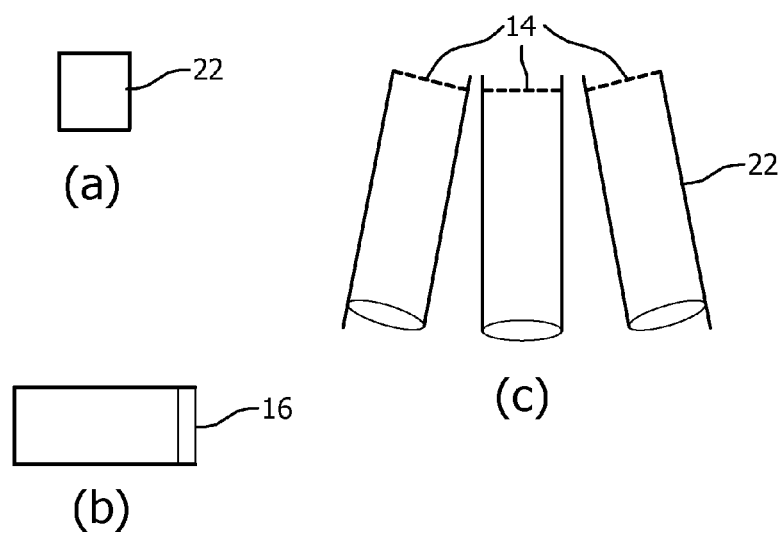
FIG. 3 shows the different orientations of the light tubes of FIG. 2 in more detail.

The backlight sub-array 14 is placed at the focal plane of the lens unit. To improve performance, the backlight sub-array may be placed closer to or further from the lens. The backlight sub-array is oriented such that the optical axis of the lens 16 lies normal to the plane that contains the backlight sub-array. This is shown more clearly in FIG. 3 in which FIG. 3(a) shows the front view of a single light tube and FIG. 3(b) shows a side view. The non-transparent boundary is shown as 22. FIG. 3(c) shows the three different orientations side by side, and shows the plane of the backlight sub-array parallel to the lens, i.e. perpendicular to the lens optical axis.

An alternative arrangement is to place all the backlight sub-arrays 14 for all tubes on one common plane surface. In this case, an additional correcting lens can be placed at the exit end of each tube, as part of the lens unit, to provide the required focusing of rays.

Each backlight sub-array can comprise closely packed LEDs or OLED strips. Alternatively, the light source matrix may consist of a miniature LED or OLED display.

By way of example, each tube of the lens tube array can be 1 cm wide, 1 cm high and 2 cm deep. For a 3D backlight of 1 m wide and 0.5 m high this means that the tube array has 5000 tubes where each tube has a lens and a separate miniature LED or OLED display at the back.

Each light tube can have a backlight sub-array with approximately 30 lighting segments in the row direction. More generally there may be between 10 and 50. The more segments, the greater the directional control, but the lower the intensity. There can be only one segment in the column direction since resolution is not needed in the column direction. However, a 2D array of backlight segments in the backlight sub-array can be used. The size of the backlight sub-array thus is large enough to have the required number of backlight segments, but small enough that the overall size (in particular thickness) of the backlight can be made small. A smaller tube entrance and exit face results in a smaller tube length, and thereby a reduced overall backlight thickness. With an approximate length to width ratio of the tubes of around 2:1, the light tubes preferably have a width dimension at most a few centimeters.

The fixed direction of the three sets of light tubes can for example be 0 degrees, minus 20 degrees and plus 20 degrees. This 20 degree offset can more generally be any angle, for example in the range 10 to 30 degrees.

Figure 4:
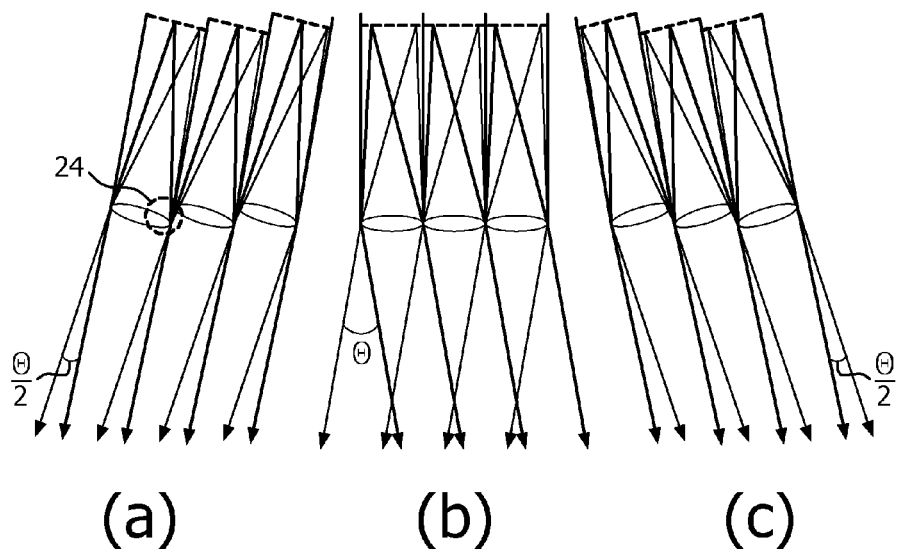
FIG. 4 shows the angular relationship between light tubes.

FIG. 4 shows light ray paths that correspond to the most left and most right position on a lens such that each lens is fully lit horizontally.

Switching on one single LED of the backlight sub-array, or a small group of LEDs, results in a more or less collimated beam of light in a direction that depends both on the orientation of the lens tube and on the position of the LED or LEDs relative to the optical axis of the lens.

FIG. 4 shows how the oriented lens tube configuration doubles the opening angle from θ to 2θ, where θ is the output angle range for one light tube. FIG. 4 shows the left directed tubes in FIG. 4(a), the normally directed tubes in FIG. 4(b) and the right directed tubes in FIG. 4(c). This factor of two (instead of three) results from overlap between the light output directions. For the left-oriented lenses (FIG. 4(a)) the right-half of the opening angle θ cannot be used since then the tube matrix becomes visible. The same applies for the left-half of the opening angle of the right-oriented lenses (FIG. 4(c)).

This problem of the tube matrix being visible is caused by the requirement that all rotated lenses should be generally arranged on the same surface, which implies that each tube in the tube array is shifted with respect to its neighbours as shown in FIG. 4. The effect is that for some viewing angles the absorbing boundary becomes visible, for example region 24 shown in FIG. 4(a). These angles are thus excluded and are instead provided by the normally directed tubes.

Figure 5:
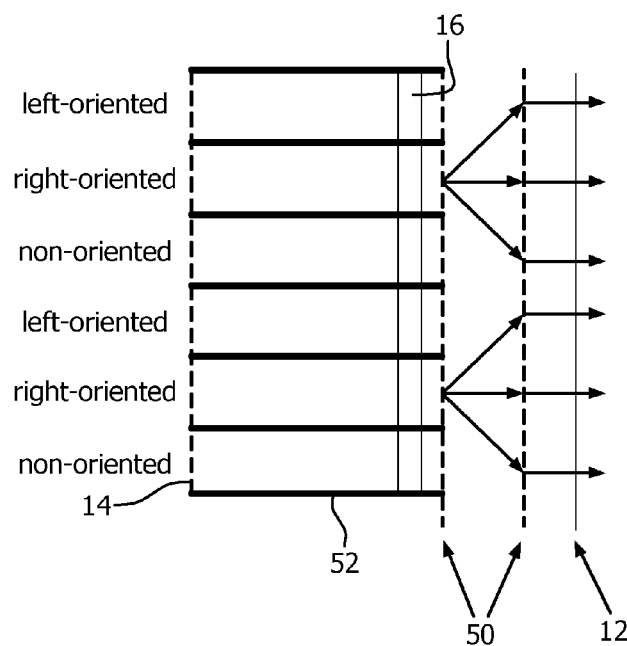
FIG. 5 shows the optical parts of an auto-stereoscopic display device of the invention.

FIG. 5 shows how the lens tube array can be used within an auto-stereoscopic display. FIG. 5 shows a side view of the device. Rows in the lens tube array correspond to different orientations.

To spread light vertically, two vertical diffuser sheets 50 are placed between the lens tube array and the LCD display panel 12. Alternatively, the horizontally oriented tube matrix material can be made reflective and one vertical diffuser can then be removed.

Light-steering is only done in the horizontal direction via the light tube configuration and the selection of light sources. The light is not collimated in the vertical direction.

A reflective horizontal matrix material increases the amount of light that leaves the tubes under a large vertical angle, thereby making vertical diffusion more effective.

The light tubes are separate by mechanical separators 52 to provide mechanical strength.

The display panel can be completely standard, for example a standard HD panel. Each light tube thus illuminates a sub-array of the pixels of the panel.

The decision of which set of backlight sub-arrays and associated light tubes to select for the left and right eyes of the viewer depends on the 2D location of the eyes relative to the display.

Figure 6:
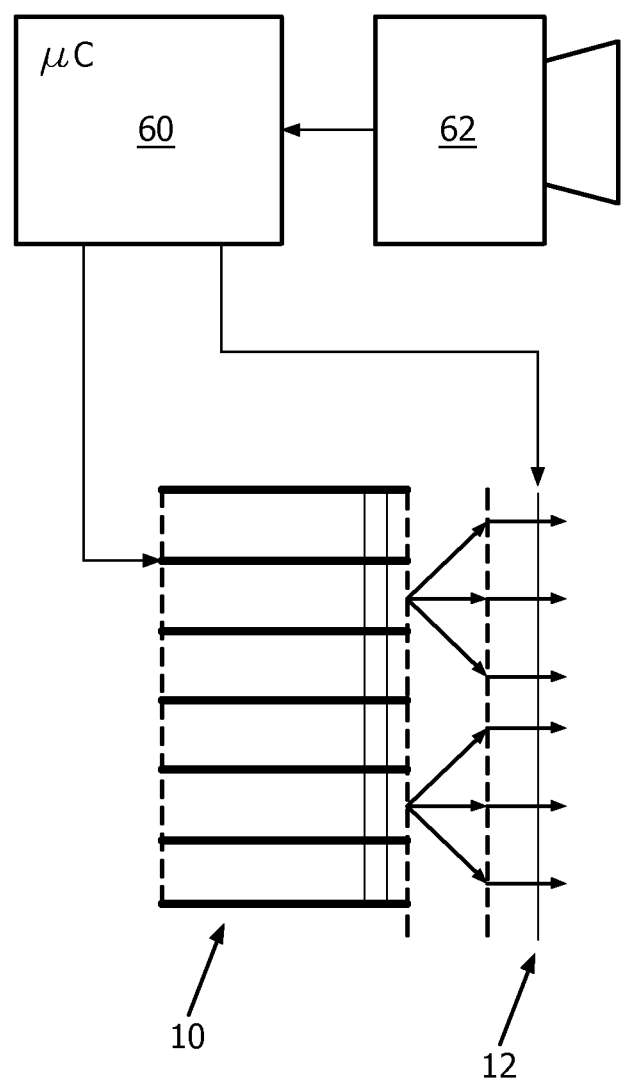
FIG. 6 shows the electronic components in addition to the optical components of FIG. 5.

The complete system is shown in FIG. 6.

The backlight arrangement of light tubes and lenses is shown as 10 for illuminating the display panel 12. A controller 60 receives an input from a head-tracking arrangement 62 which tracks the pupils of one or more viewers.

The controller 60 controls the display panel 12 to provide an output image for presentation to one pupil of one viewer. Each displayed image is thus a full resolution display at the native resolution of the display panel. The controller also selects which set of backlight sub-arrays to use, as well as controlling the backlight sub-arrays to generate the desired light output direction from the light tubes.

The different images required (two per viewer) are provides in a time sequential manner. For this purpose, the display panel has a high refresh rate, for example 240 Hz or more. There will be a maximum number of users for which separate images can be provided, for example 2, 3 or 4.

The head-tracking arrangement can comprise one or multiple cameras mounted on the display.

Figure 7:
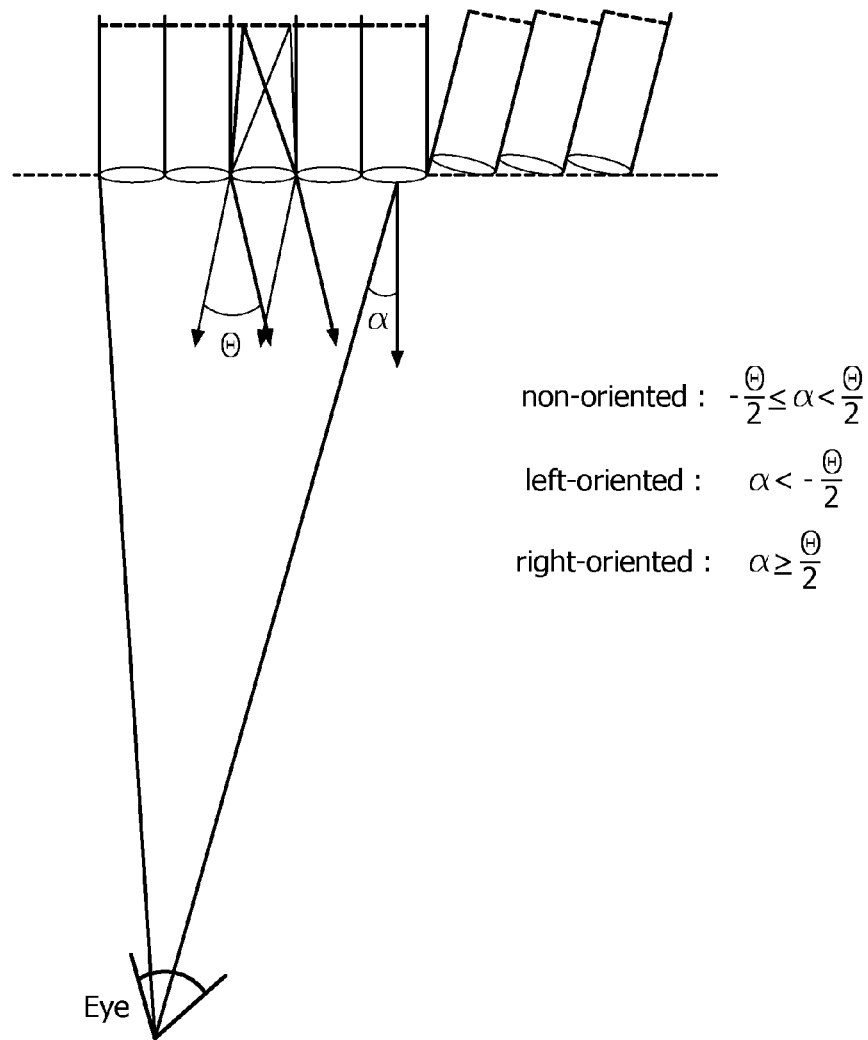
FIG. 7 is used to explain how the light tubes are selected and how the associated backlight sub-arrays are controlled.

The decision on which set of backlight sub-arrays to be used can be carried out using the following steps:

1. For a detected eye-location, the angle $\alpha$ is calculated as shown in FIG. 7 which is the angle between the line that connects the eye and the centre of each column of tubes in the matrix and the normal to the display surface. This angle varies slightly across the display, with the variation being greater for closer viewing distances. The angle can be determined for each column, so that the illumination direction for each column of the display can be selected independently.

2. The magnitude of a is compared with the magnitude of the lens opening angle θ. A decision is then made about which tube orientation to use. The decision rule is shown in FIG. 7. Essentially, if the required orientation is outside the range of the normally directed light tubes, one of the sets of laterally directed light tubes is used.

3. The angle between the line that connects the eye and the centre of the tube lens and the optical-axis of the selected tube lens is then used to calculate which light source (or light sources) of the backlight sub-array to use to steer light towards the eye. Since refraction occurs at the lens air/interface, and multiple lenses may be present in each lens unit, this calculation takes into account all of the air/lens material ray-direction changes.

The viewing direction required for each column of the backlight arrangement can be determined independently for each image, i.e. the left and right images can result in a different set of light tube selections. As also mentioned above, within an image, different parts of the image can be provided by different light tube directions, or else single light tube directions may be selected for the whole of each image.

The invention has been described above in connection with three sets of light tubes. However two can be used, both laterally offset from the normal direction. It is however, preferred to have a normally directed set of light tubes, since the normal direction is likely to represent the ideal viewing position, and the most likely position for a single viewer. This implies that there is preferably an odd number of sets of light tubes, for example 3 or 5.

The controller has not been described in detail. Essentially, it combines the function of a standard display driver with logic to select with light tubes to use, and to derive the backlight segments which need to be oriented. This involves basic trigonometric functions once a viewer position has been determined. The head-tracking system can be totally conventional, and such systems are already used in head-tracking auto-stereoscopic displays.

The display panel can be an LCD panel or any other light modulating display technology.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A backlight arrangement for an auto-stereoscopic display device, comprising:
   a segmented backlight; and
   a lens arrangement comprising an array of lens units,
   wherein a respective sub-array (14) of backlight segments is associated with each lens unit (16) of the lens arrangement, such that the lens unit (16) directs light output from different backlight segments in different directions,
   wherein each backlight sub-array (14) provides illumination to a light tube (20) with the respective lens unit at the end of the light tube,
   wherein the light tubes comprise at least two sets, with the light tubes of a first set all parallel to each other and facing a first direction and the light tubes of a second set all parallel to each other and facing a second direction, and
   wherein each light tube (20) has an exit area of between 0.25 square centimeters and 4 square centimeters.

2. An arrangement as claimed in claim 1, wherein the light tubes (20) comprise three sets, wherein the light tubes of the first set are directed normally to the display panel, the light tubes of the second set are directed laterally to one side of the normal and the light tubes of the third set are directed laterally to the other side of the normal.

3. An arrangement as claimed in claim 2, wherein the light tubes (20) of the second and third sets are directed laterally to the side of the normal by an amount between 10 and 30 degrees.

4. An arrangement as claimed in claim 1, wherein each sub-array (14) comprises an array of individually addressable light segments, wherein there are at least 10 columns of light segments in each sub-array.

5. An arrangement as claimed in claim 1, wherein each set of light tubes (20) comprises a plurality of rows of light tubes, with light tubes of one set alternated with the light tubes of the other sets.

6. An arrangement as claimed in claim 1, further comprising a vertical diffuser (50) at the output of the backlight arrangement.

7. An auto-stereoscopic display device comprising a backlight arrangement as claimed in claim 1; and a light modulating display panel (12) illuminated by the backlight arrangement.

8. A display device as claimed in claim 7, further comprising a camera arrangement (62) for tracking the location of one or more viewers, and wherein the display further comprises a controller (60) adapted to select which set of light tubes to use for each image to be presented in dependence on the viewer location, and to control the backlight arrangement to control the direction of illumination to the display panel for each image.

9. A method of controlling an auto-stereoscopic display device which comprises a backlight arrangement comprising a segmented backlight and a lens arrangement comprising an array of lens units (16), wherein a respective sub-array (14) of backlight segments is associated with each lens unit (16) of the lens arrangement, such that the lens unit directs light output from different backlight segments in different directions, wherein the method comprises the steps of:
   aligning each backlight sub-array (14) with a light tube (20) having the respective lens unit (16) at the end of the light tube, and wherein the light tubes comprise at least two sets, with the light tubes of a first set all parallel to each other and facing a first direction and the light tubes of a second set all parallel to each other and facing a second direction and wherein each light tube (20) has an exit area of between 0.25 square centimeters and 4 square centimeters;
   detecting the position of a viewer;
   based on the viewer position, determining which set of light tubes to use to display an image to each eye of the viewer; and
   for the selected light tubes, controlling the associated sub-array (14) of backlight segments to provide illumination in a direction through a light modulating display panel to each eye of the viewer.

10. A method as claimed in claim 9, wherein the light tubes (20) comprise three sets, wherein the light tubes of the first set are directed normally to the display panel, the light tubes of the second set are directed laterally to one side of the normal and the light tubes of the third set are directed laterally to the other side of the normal.

* * * * *